Patented Feb. 18, 1936

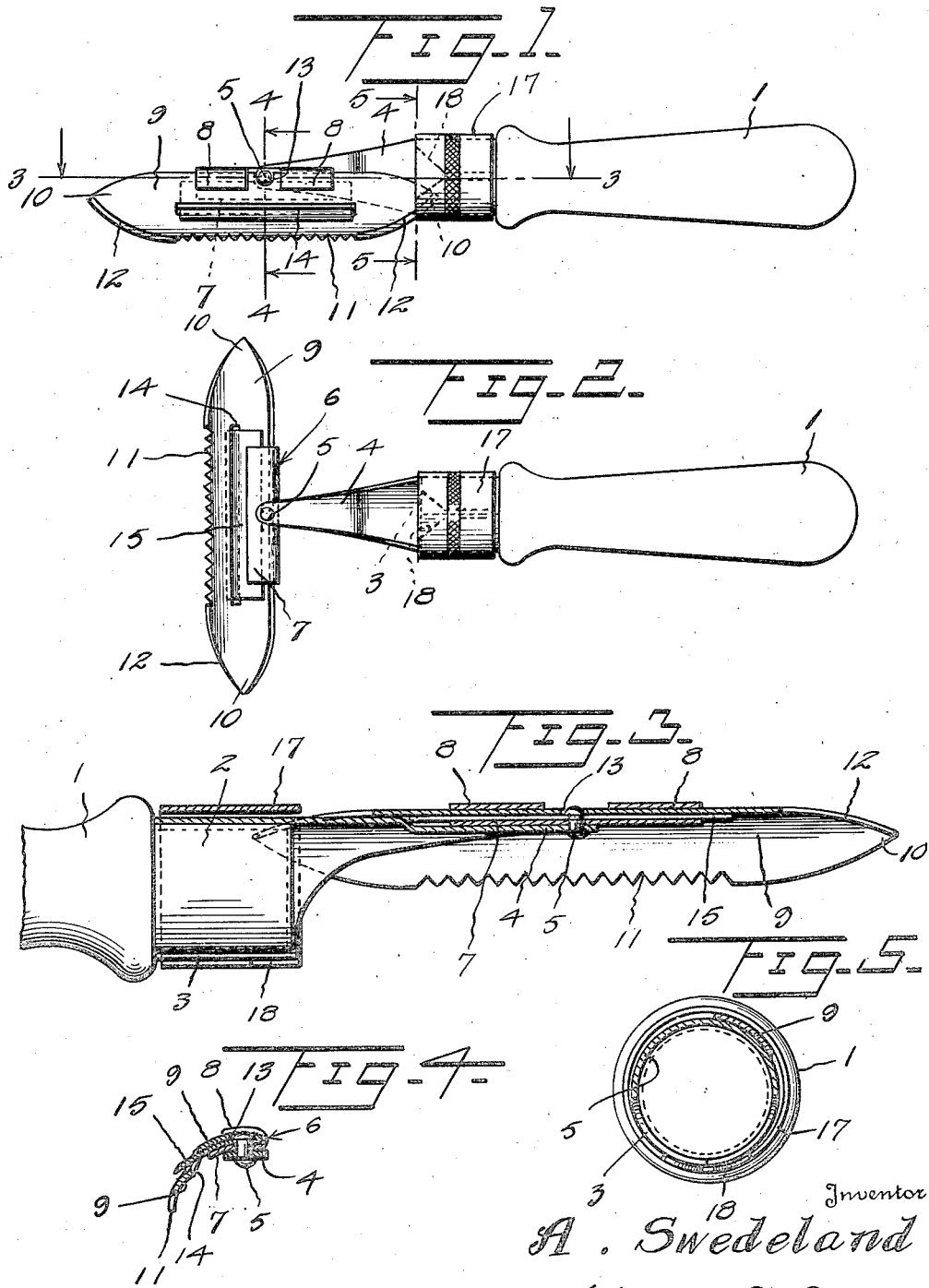

2,031,191

UNITED STATES PATENT OFFICE 2,031,191

PARING KNIFE

Adolf Swedeland, Chicago, Ill.

Application September 13, 1934, Serial No. 743,901

6 Claims. (Cl. 30—20.1)

This invention relates to improvements in culinary articles and pertains particularly to an improved paring knife.

The primary object of the present invention is to provide a novel form of paring knife having a removable paring blade which is held in such a position with regard to a guard member as to facilitate the paring of a peel of constant thickness.

Another object of the invention is to provide an improved paring knife in which the paring blade is readily reversible so that the knife may be used with facility by either left or right handed persons.

Still another object of the invention is to provide an improved vegetable knife having an arcuate coring blade on which is removably secured a cutting or paring blade which is maintained with its cutting edge directed through a slot of the corer which acts as a guard for the paring or cutting blade.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in plan of the parer embodying the present invention, showing the same set for use in the left hand.

Figure 2 is a view in plan similar to Figure 1, but showing the corer and paring blade carried thereby swung half-way from one working position toward the other.

Figure 3 is a longitudinal sectional view taken on the line 3—3 of Figure 1.

Figure 4 is a sectional view on the line 4—4 of Figure 1.

Figure 5 is a sectional view on the line 5—5 of Figure 1.

Referring to the drawing, the numeral 1 indicates the handle of the present parer and corer, the forward end of which is provided with a reduced extension 2. Secured about the extension 2 of the handle is a collar 3 from which there extends forwardly in a line parallel with the handle, the arm 4 which is of constantly decreasing width so that it tapers to its outer or free end to a relatively narrow width. At the outer end of the arm 4, there is rotatably secured thereto, the stud or rivet 5 which secures to the arm a friction clamp 6, which comprises an elongated plate 7 through which the rivet 5 passes, and the two opposed short plates 8 which are integral with the long plate along one edge and which are disposed on opposite sides of the rivet 5.

The numeral 9 indicates a corer blade which, as shown, is in the form of a relatively long transversely arcuate metal body which is pointed at either end, as indicated at 10, and which has one longitudinal edge toothed, as indicated at 11. The portion of each longitudinal edge extending from each end of the toothed portion to the adjacent point is sharpened, as indicated at 12, to facilitate turning the corer in a vegetable or fruit.

The opposite longitudinal edge of the corer 9 has a notch 13 therein at the transverse center of the corer in which one end of the rivet 5 locates when the adjacent edge of the corer is disposed between the plate 7 at one side of the friction clamp and the two plates 8 at the opposite side thereof, as illustrated in Figure 1.

In the central part of the corer 9, there is formed a longitudinally extending slot 14, and this slot is designed to receive the sharpened or cutting edge of a removable blade 15, the main body portion of the blade lying against the inner or concave face of the corer and being held in this position by the plate 7 of the friction clamp 6. This plate 7 of the friction clamp overlies the removable blade 15 so that this blade and the corer are frictionally secured between the plates 7 and 8.

While the blade 15 may be formed in any suitable manner for use in association with the parer and corer, it is intended that this may form a half of a longitudinally divided safety razor blade as such a blade will give a more satisfactory cutting action and is of thin flexible steel so that it may be readily pressed into the concave face of the corer by the friction clamp and securely held in operative position.

It will be readily apparent that the corer is oscillatable upon the rivet 5 so that the toothed edge 11 and the sharpened edge of the paring blade may be faced in either of two directions, thus changing or altering the character of the implement for use in the right or the left hand. In either of the two positions of the corer, a portion of a pointed end 10 overlies the side of the sleeve 3 and the corer is secured in position by the split collar 17 which frictionally engages about the sleeve 3 and which is cut in its forward edge to provide the V-opening 18 which, when brought into position over the end of the corer 9, allows the said end to spring out so that the corer may be turned on the pivot rivet 5.

From the foregoing, it will be readily apparent that with the present implement, many kitchen operations may be expeditiously performed and also the implement may be used with facility by either a right or left handed person.

What is claimed is:—

1. An implement of the character described, comprising a handle, an elongated transversely arcuate body extending from one end of the handle, said body having a longitudinal slot therethrough, a paring blade disposed against the concave face of said body and having a sharpened edge extending through said slot and its opposite edge lying adjacent a longitudinal edge of the body, and a securing element engaging over said body at one longitudinal edge and having a portion overlying said blade and securing the same against said arcuate face.

2. An implement of the character described, comprising a handle, an elongated transversely arcuate body designed to extend from one end of and in end to end longitudinal relation with the handle, said body having a longitudinal slot therethrough, a paring blade disposed against the concave face of said body and having a sharpened edge extending through said slot and its opposite edge lying adjacent a longitudinal edge of the body, a securing element engaging over a longitudinal edge of the said body and having a portion overlying said blade and securing the same against said arcuate face, and means for reversing the said arcuate body end for end with respect to the handle whereby the cutting edge of said blade will be reversed.

3. An implement of the character described, comprising a handle having a reduced end portion, a ferrule surrounding said reduced portion and having an integral arm extending from a portion of the edge thereof longitudinally of the handle, an elongated clamping member pivotally attached intermediate its ends to the free end of said arm, an elongated transversely arcuate body having a longitudinally extending slot therein and having one longitudinal edge engaged in and held by said clamp, said member being movable with the clamp on its pivot into parallel relation with the arm with an end extending over said ferrule, a blade disposed against the concave face of the member with an edge extending through said slot and held in position by said clamp, and a securing collar surrounding the ferrule and adapted to detachably secure an adjacent end of the member.

4. An implement of the character described, comprising a handle having a reduced end portion, a ferrule surrounding said reduced portion and having an integral arm extending from a portion of the edge thereof longitudinally of the handle, an elongated clamping member pivotally attached intermediate its ends to the free end of said arm, an elongated transversely arcuate body having a longitudinally extending slot therein and having one longitudinal edge engaged in and held by said clamp, said member being movable with the clamp on its pivot into parallel relation with the arm with an end extending over said ferrule, a blade disposed against the concave face of the member with an edge extending through said slot and held in position by said clamp, said member having each end formed into a point, and a securing collar for the member loosely surrounding the ferrule and having a notch cut into the edge nearest the member to facilitate entrance of the pointed end member beneath the collar when the collar is turned.

5. An implement of the character described, comprising a handle, an arm extending longitudinally from one end of the handle, an elongated clamping member pivotally attached intermediate its end to the free end of said arm, an elongated body, a cutting blade disposed against one face of said body intermediate its ends and having a cutting edge disposed relative to the body for the performance of a paring operation and having its opposite edge disposed adjacent a longitudinal edge of the body, said clamping member engaging over the said longitudinal edge of the body and the blade edge adjacent thereto whereby the body and blade may be rotated upon said arm, and means for maintaining the body in parallel relation with the arm.

6. An implement of the character described, comprising a handle, an arm extending longitudinally from one end of the handle, an elongated clamping member pivotally attached intermediate its end to the free end of said arm, an elongated body, a cutting blade disposed against one face of said body intermediate its ends and having a cutting edge disposed relative to the body for the performance of a paring operation and having its opposite edge disposed adjacent a longitudinal edge of the body, said clamping member engaging over the said longitudinal edge of the body and the blade edge adjacent thereto whereby the body and blade may be rotated upon said arm, and a shiftable securing element carried at the end of the handle adjacent its point of connection with the arm for engaging either end of the body when the same is swung into parallel relation with the arm to maintain the body in operative position.

ADOLF SWEDELAND.